United States Patent
Yasui et al.

(10) Patent No.: US 9,611,933 B2
(45) Date of Patent: Apr. 4, 2017

(54) CONTINUOUSLY VARIABLE TRANSMISSION AND CONTROL METHOD THEREFOR

(71) Applicants: JATCO LTD, Fuji-shi, Shizuoka (JP); NISSAN MOTOR CO., LTD., Yokohama-shi, Kanagawa (JP)

(72) Inventors: Yoshio Yasui, Machida (JP); Tomoyuki Mizuochi, Sagamihara (JP); Seiichiro Takahashi, Isehara (JP); Takashi Eguchi, Machida (JP); Yohei Shimokawa, Isehara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 283 days.

(21) Appl. No.: 14/408,372

(22) PCT Filed: May 28, 2013

(86) PCT No.: PCT/JP2013/064711
§ 371 (c)(1),
(2) Date: Dec. 16, 2014

(87) PCT Pub. No.: WO2013/190954
PCT Pub. Date: Dec. 27, 2013

(65) Prior Publication Data
US 2015/0148156 A1 May 28, 2015

(30) Foreign Application Priority Data

Jun. 20, 2012 (JP) .................................. 2012-138623

(51) Int. Cl.
*F16H 61/662* (2006.01)
*F16H 61/70* (2006.01)

(52) U.S. Cl.
CPC . *F16H 61/66231* (2013.01); *F16H 61/66259* (2013.01); *F16H 61/702* (2013.01); *F16H 2061/66218* (2013.01); *F16H 2061/66295* (2013.01)

(58) Field of Classification Search
None
See application file for complete search history.

(56) References Cited

U.S. PATENT DOCUMENTS

| 4,649,486 | A | 3/1987 | Oshiage |
| 5,976,054 | A | 11/1999 | Yasuoka |
| 7,824,308 | B2 * | 11/2010 | Liu ...................... B60W 10/06 477/109 |

(Continued)

FOREIGN PATENT DOCUMENTS

| JP | 59-121244 A | 7/1984 |
| JP | 59-166752 A | 9/1984 |

(Continued)

*Primary Examiner* — Edwin A Young
(74) *Attorney, Agent, or Firm* — Foley & Lardner LLP (57) ABSTRACT

A transmission controller searches a mechanical High, which is a minimum value of a possible speed ratio of the continuously variable transmission (CVT), based on an actual speed ratio, sets a control High lower than the mechanical High by a predetermined amount, and controls a speed ratio of the CVT by setting a minimum value of a speed ratio range of the CVT at the control High.

7 Claims, 7 Drawing Sheets

(56) References Cited

U.S. PATENT DOCUMENTS

2001/0049574 A1* 12/2001 Taniguchi .......... B60W 10/107
 701/51
2004/0235615 A1* 11/2004 Deguchi ................ B62M 9/04
 477/43

FOREIGN PATENT DOCUMENTS

| JP | 03-189457 A | 8/1991 |
| JP | 04-140555 A | 5/1992 |
| JP | 09-144861 A | 6/1997 |
| JP | 11-020512 A | 1/1999 |
| JP | 2006-118566 A | 5/2006 |

* cited by examiner

FIG. 7

CONTINUOUSLY VARIABLE TRANSMISSION AND CONTROL METHOD THEREFOR

TECHNICAL FIELD

The prevent invention relates to a control of a continuously variable transmission.

BACKGROUND ART

JP59-166752A discloses a technology capable of enlarging a usable speed ratio range and improving fuel economy performance and acceleration performance of a vehicle equipped with a continuously variable transmission (hereinafter, referred to as "CVT") by searching a maximum value (hereinafter, referred to as "mechanical Low") and a minimum value (hereinafter, referred to as "mechanical High") of a speed ratio in which a shift is actually possible in the CVT, using the searched values as target speed ratios for shift control when the searched mechanical Low and High exceed speed ratios set to have a narrower speed ratio width than that based on the design of pulleys used in a shift control and learning actually possible speed ratios for the individual CVT by executing the shift control for the CVT.

SUMMARY OF INVENTION

However, in the case where a control is executed using the mechanical High as the target speed ratio in the shift control of the CVT, there has been a problem of taking time until a shift at an actual speed ratio is started even if it is attempted to downshift the CVT during acceleration.

This is because a speed ratio feedback control of controlling the actual speed ratio to the target speed ratio is executed and the actual speed ratio fluctuates about the target speed ratio in the shift control of the CVT.

That is, in the speed ratio feedback control, a correction to increase a primary pressure when the actual speed ratio becomes lower than the target speed ratio and a correction to decrease the primary pressure when the actual speed ratio becomes higher than the target speed ratio are alternately repeated, and the actual speed ratio fluctuates with a predetermined amplitude about the target speed ratio even if the target speed ratio is constant. If the target speed ratio is set at the mechanical High, the actual speed ratio is not shifted toward a higher side than the target speed ratio, wherefore only the correction to increase the primary pressure is repeatedly performed. If the correction to increase the primary pressure is repeatedly performed, the primary pressure becomes excessively larger than a proper value and it takes time to lower the primary pressure and to start a shift even if it is attempted to downshift the CVT during acceleration.

Accordingly, the present invention aims to improve fuel economy of a vehicle equipped with a CVT by enlarging a speed ratio range of the CVT to the vicinity of a mechanical High and enable quick downshifting in a situation where quick downshifting is necessary.

According to one aspect of the present invention, a continuously variable transmission is provided in which an actual speed ratio is feedback-controlled to a target speed ratio and which includes mechanical High searching means for searching a mechanical High, which is a minimum value of a possible speed ratio of the continuously variable transmission, based on the actual speed ratio, control High setting means for setting a control High lower than the mechanical High by a predetermined amount, and speed ratio controlling means for controlling a speed ratio of the continuously variable transmission by setting a minimum value of a speed ratio range of the continuously variable transmission at the control High.

Further, according to another aspect of the present invention, a control method for a continuously variable transmission is provided which feedback-controls an actual speed ratio to a target speed ratio, and includes searching a mechanical High, which is a minimum value of a possible speed ratio of the continuously variable transmission, based on the actual speed ratio, setting a control High lower than the mechanical High by a predetermined amount, and controlling a speed ratio of the continuously variable transmission by setting a minimum value of a speed ratio range of the continuously variable transmission at the control High.

According to these aspects, since the actual speed ratio can fluctuate about the control High also while a control is executed with the target speed ratio as the control High, an FB operation amount is not accumulated even if the control is executed with the target speed ratio as the control High and good shift responsiveness is obtained in the case of downshifting the CVT during acceleration.

An embodiment and advantages of the present invention are described in detail below along with the accompanying drawings.

DESCRIPTION OF EMBODIMENTS

Figure 1:
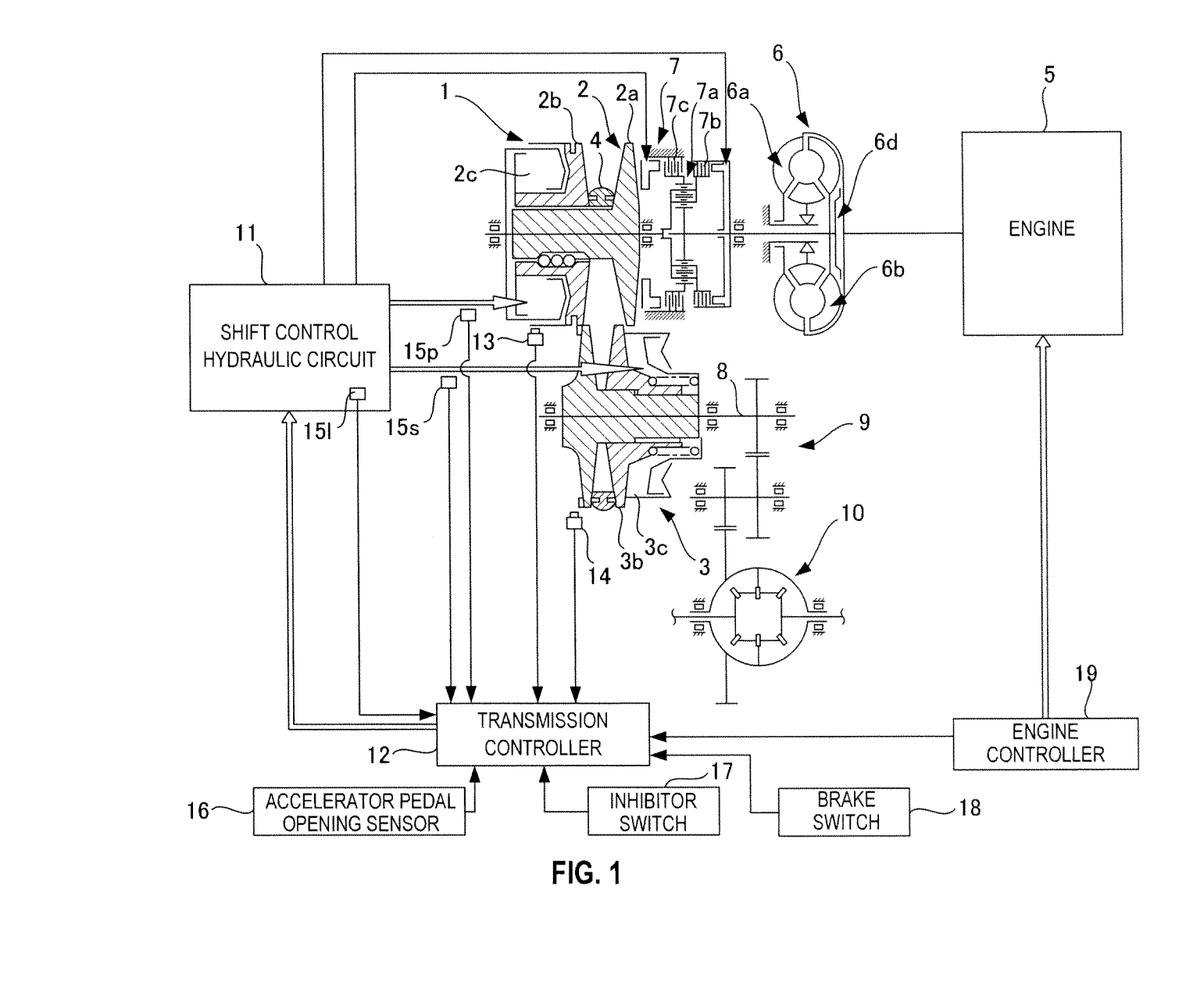
FIG. 1 is a schematic configuration diagram of a continuously variable transmission.

FIG. 1 shows a schematic configuration of a continuously variable transmission (hereinafter, referred to as "CVT") 1. A primary pulley 2 and a secondary pulley 3 are so arranged that grooves thereof are aligned, and a belt 4 is mounted in the grooves of these pulleys 2, 3. An engine 5 is arranged coaxially with the primary pulley 2, and a torque converter 6 and a forward/reverse switching mechanism 7 are provided in this order from the side of the engine 5 between the engine 5 and the primary pulley 2.

The torque converter 6 includes a pump impeller 6a coupled to an output shaft of the engine 5, and a turbine runner 6b, a stator 6c and a lock-up clutch 6d coupled to an input shaft of the forward/reverse switching mechanism 7.

The forward/reverse switching mechanism 7 includes, as a main constituent element, a double pinion planetary gear set 7a, a sun gear of which is connected to the turbine runner 6b of the torque converter 6 and a carrier of which is connected to the primary pulley 2. The forward/reverse switching mechanism 7 further includes a starting clutch 7b directly coupling the sun gear and the carrier of the double pinion planetary gear set 7a and a reverse brake 7c for fixing a ring gear. When the starting clutch 7b is engaged, input rotation from the engine 5 via the torque converter 6 is transmitted to the primary pulley 2 as it is. When the reverse brake 7c is engaged, the input rotation from the engine 5 via the torque converter 6 is transmitted to the primary pulley 2 after being reversed.

The rotation of the primary pulley 2 is transmitted to the secondary pulley 3 via the belt 4, and the rotation of the secondary pulley 3 is transmitted to unillustrated drive wheels via an output shaft 8, a gear set 9 and a differential gear device 10.

To make a speed ratio between the primary pulley 2 and the secondary pulley 3 changeable during the above power transmission, one of conical plates forming the groove of each of the primary pulley 2 and the secondary pulley 3 is a fixed conical plate 2a, 3a and the other conical plate 2b, 3b is a movable conical plate displaceable in an axial direction. It should be noted that the primary pulley 2 includes a stopper for regulating a minimum value of a groove width.

These movable conical plates 2b, 3b are biased toward the fixed conical plates 2a, 3a by supplying a primary pressure Ppri and a secondary pressure Psec generated using a line pressure PL as a source pressure to a primary pulley chamber 2c and a secondary pulley chamber 3c, whereby the belt 4 is frictionally joined to the conical plates to transmit power between the primary pulley 2 and the secondary pulley 3.

A shift is performed by changing the widths of the grooves of the both pulleys 2, 3 by a differential pressure between the primary pressure Ppri and the secondary pressure Psec to continuously change winding arc diameters of the belt 4 on the pulleys 2, 3.

The primary pressure Ppri and the secondary pressure Psec are controlled, together with hydraulic pressures supplied to the starting clutch 7b to be engaged when a forward travel range is selected and the reverse brake 7c to be engaged when a reverse travel range is selected, by a shift control hydraulic circuit 11. The shift control hydraulic circuit 11 executes a control in response to a signal from a transmission controller 12.

To the transmission controller 12 are input a signal from an input rotation speed sensor 13 for detecting an input rotation speed Nin of the CVT 1, a signal from a vehicle speed sensor 14 for detecting an output rotation speed Nout of the CVT 1, i.e. a vehicle speed VSP, a signal from a primary pressure sensor 15p for detecting the primary pressure Ppri, a signal from a secondary pressure sensor 15s for detecting the secondary pressure Psec, a signal from a line pressure sensor 15l for detecting the line pressure PL, a signal from an accelerator pedal opening sensor 16 for detecting an accelerator pedal opening APO, a selected range signal from an inhibitor switch 17 for detecting a select lever position, a signal from a brake switch 18 for detecting whether or not a brake pedal is depressed and signals on operating states (engine rotation speed Ne, engine torque, fuel injection period, cooling water temperature TMPe, etc.) of the engine 5 from an engine controller 19 for controlling the engine 5.

Figure 2:
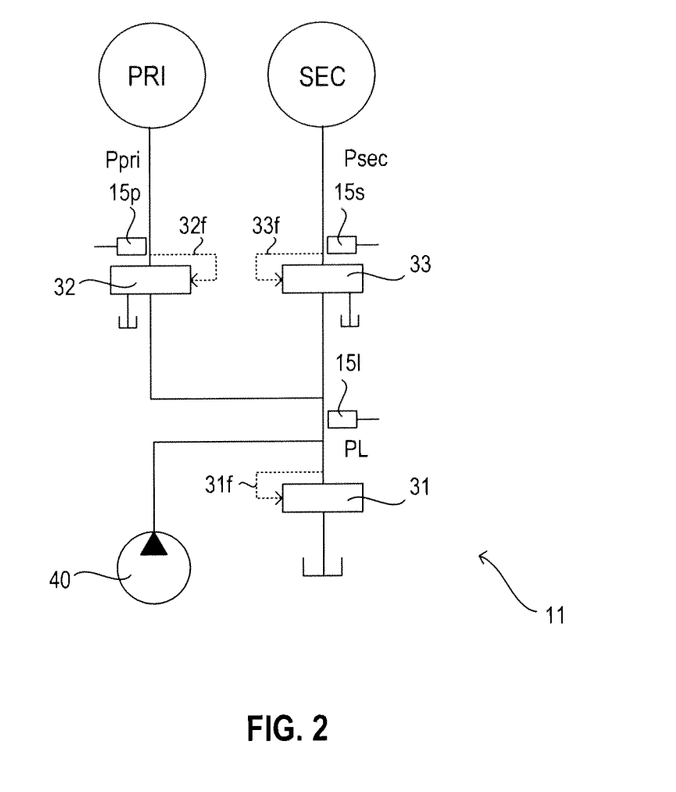
FIG. 2 is a schematic configuration diagram of a shift control hydraulic circuit.

FIG. 2 shows a schematic configuration of the shift control hydraulic circuit 11.

The shift control hydraulic circuit 11 includes an oil pump 40, a line pressure regulating valve 31, a primary pressure regulating valve 32 and a secondary pressure regulating valve 33.

The oil pump 40 is driven by the engine 5.

The line pressure regulating valve 31 is a drain pressure regulating valve for regulating the line pressure PL to a target line pressure tPL by draining a part of a discharge pressure of the oil pump 40 to reduce the pressure.

The primary pressure regulating valve 32 and the secondary pressure regulating valve 33 are drain pressure regulating valves for regulating the primary pressure Ppri and the secondary pressure Psec respectively to a target primary pressure tPpri and a target secondary pressure tPsec by using the line pressure PL as the source pressure and draining a part of the line pressure PL to reduce the pressure.

The line pressure regulating valve 31, the primary pressure regulating valve 32 and the secondary pressure regulating valve 33 respectively include feedback circuits 31f, 32f and 33f for returning the hydraulic pressure after pressure regulation to the regulating valve and feedback-controlling the hydraulic pressure after pressure regulation to the target hydraulic pressure.

Next, control contents of the transmission controller 12 are described with reference to FIGS. 3 to 5.

Figure 3:
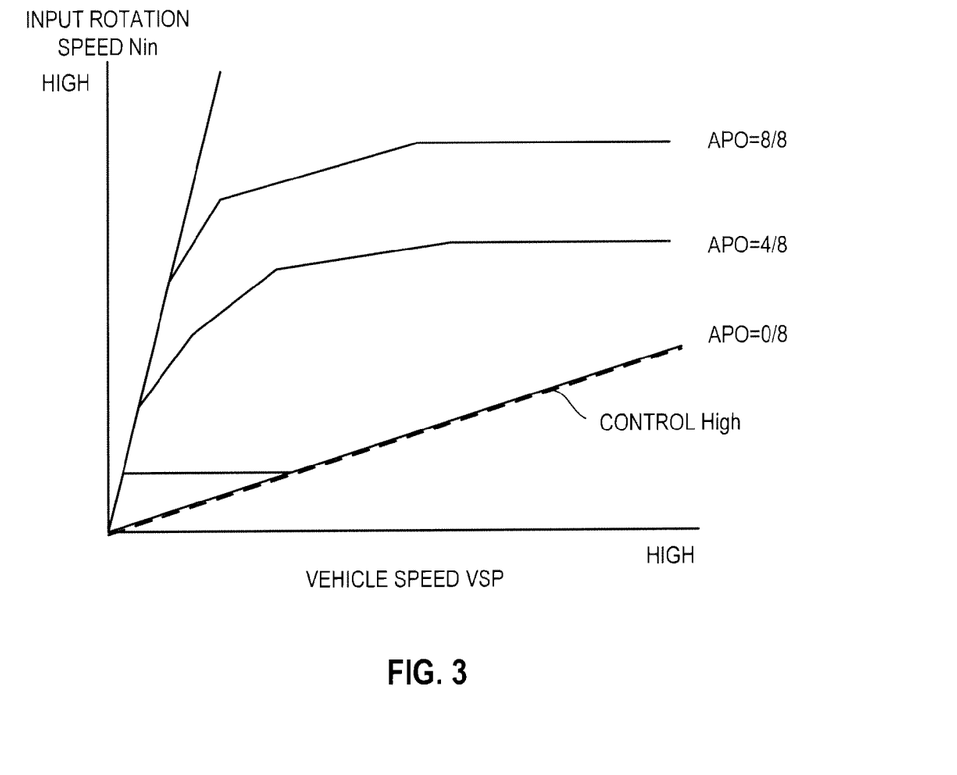
FIG. 3 is a shift map.
Figure 4:
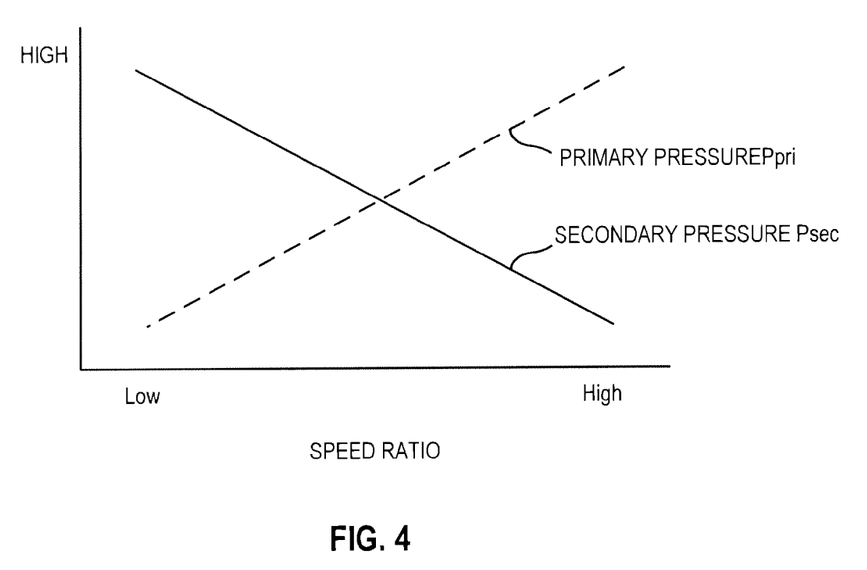
FIG. 4 is a table for setting a target primary pressure and a target secondary pressure.

The transmission controller 12 first refers to a shift map shown in FIG. 3 and sets a target speed ratio of the CVT 1. The shift map is a map for determining the input rotation speed Nin based on the vehicle speed VSP and the accelerator pedal opening APO, and the target speed ratio is set by obtaining a ratio of the determined input rotation speed Nin and the output rotation speed Nout.

A shift line at the accelerator pedal opening APO=0/8 is set on a control High to be described later, i.e. a minimum value of the speed ratio range of the CVT 1 is set at the control High and the target speed ratio is set not lower than the control High.

It should be noted that although only shift lines at the accelerator pedal openings APO=0/8, 4/8 and 8/8 are shown in FIG. 3 for simplification, shift lines for other accelerator pedal openings APO are also set in the shift map.

Subsequently, the transmission controller 12 refers to a table shown in FIG. 4 and sets the target primary pressure tPpri and the target secondary pressure tPsec. The table shown in FIG. 4 is a table specifying a relationship of the speed ratio of the CVT 1, the primary pressure Ppri and the secondary pressure Psec. If the speed ratio of the CVT 1 is determined, the primary pressure Ppri and the secondary pressure Psec necessary to realize that speed ratio are uniquely determined.

Then, the transmission controller 12 controls the line pressure regulating valve 31, the primary pressure regulating valve 32 and the secondary pressure regulating valve 33 so that the primary pressure Ppri and the secondary pressure Psec respectively reach the set target primary pressure tPpri and target secondary pressure tPsec.

Further, even if the primary pressure Ppri and the secondary pressure Psec are controlled as described above, there is a deviation between the actual speed ratio and the target speed ratio due to external disturbances, manufacturing variations and the like. To eliminate this deviation, the transmission controller 12 executes a speed ratio feedback control described below.

Figure 5:
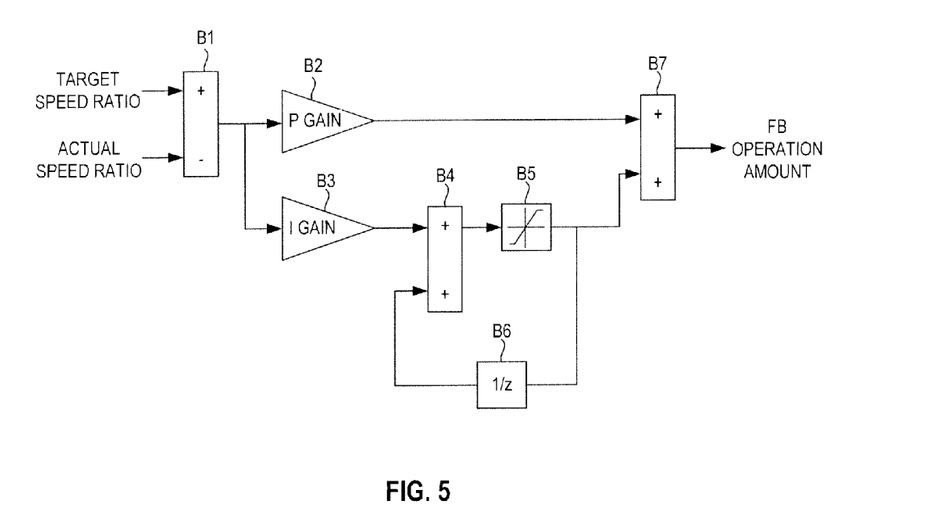
FIG. 5 is a block diagram showing the contents of a speed ratio feedback control.

FIG. 5 is a block diagram showing the contents of the speed ratio feedback control executed by the transmission controller 12.

The speed ratio feedback control is described with reference to this block diagram. In B1, a difference between the target speed ratio and the actual speed ratio is calculated and output. The actual speed ratio can be calculated based on the input rotation speed Nin detected by the input rotation speed sensor 13 and the vehicle speed VSP detected by the vehicle speed sensor 14.

In B2, a value obtained by multiplying an output value of B1 by a P gain is output as a proportional term.

In B3, a value obtained by multiplying the output value of B1 by an I gain is output. In B4 to B6, an output value of B3 is integrated and output as an integration term. B5 is a limiter for limiting the integration term. B6 is a shift operator for storing and outputting the last value of the integration term.

In B7, the proportional term as an output value of B2 and the integration term as an output value of B5 are added to calculate an FB operation amount.

After the FB operation amount is calculated in this way, the transmission controller 12 corrects the primary pressure Ppri according to the FB operation amount. Specifically, if the actual speed ratio is larger than the target speed ratio, i.e. on a Low side, the FB operation amount increases on a positive side and the primary pressure Ppri is corrected to increase. Conversely, if the actual speed ratio is smaller than the target speed ratio, i.e. on a High side, the FB operation amount increases on a negative side and the primary pressure Ppri is corrected to decrease.

According to the above speed ratio feedback control, the primary pressure Ppri is so corrected that the actual speed ratio approaches the target speed ratio. Further, even if the target speed ratio does not vary, the actual speed ratio fluctuates with a predetermined amplitude A about the target speed ratio.

To improve fuel economy of the vehicle equipped with the CVT 1, it is preferable to search a mechanical High which is a minimum value of the possible speed ratio of the CVT 1 and enlarge a High side of the speed ratio range of the CVT 1 to the searched mechanical High.

However, if the target speed ratio of the CVT 1 is set at the mechanical High, the actual speed ratio is not shifted toward a side higher than the mechanical High. Thus, the integration terms are accumulated by the speed ratio feedback control and the correction to increase the primary pressure Ppri continues. If the primary pressure Ppri becomes excessively larger than a proper value as a result, it takes time to eliminate the integration terms and the primary pressure Ppri is not easily reduced, causing a delay in downshifting, even if it is attempted to downshift the CVT 1 during acceleration.

Accordingly, in this embodiment, the speed ratio on the Low side higher than the mechanical High by the amplitude A or more (preferably only by the amplitude A) is set as the control High and the speed ratio range is expanded to this control High in consideration of the fluctuation of the actual speed ratio with the amplitude A due to the speed ratio feedback control.

Figure 6:
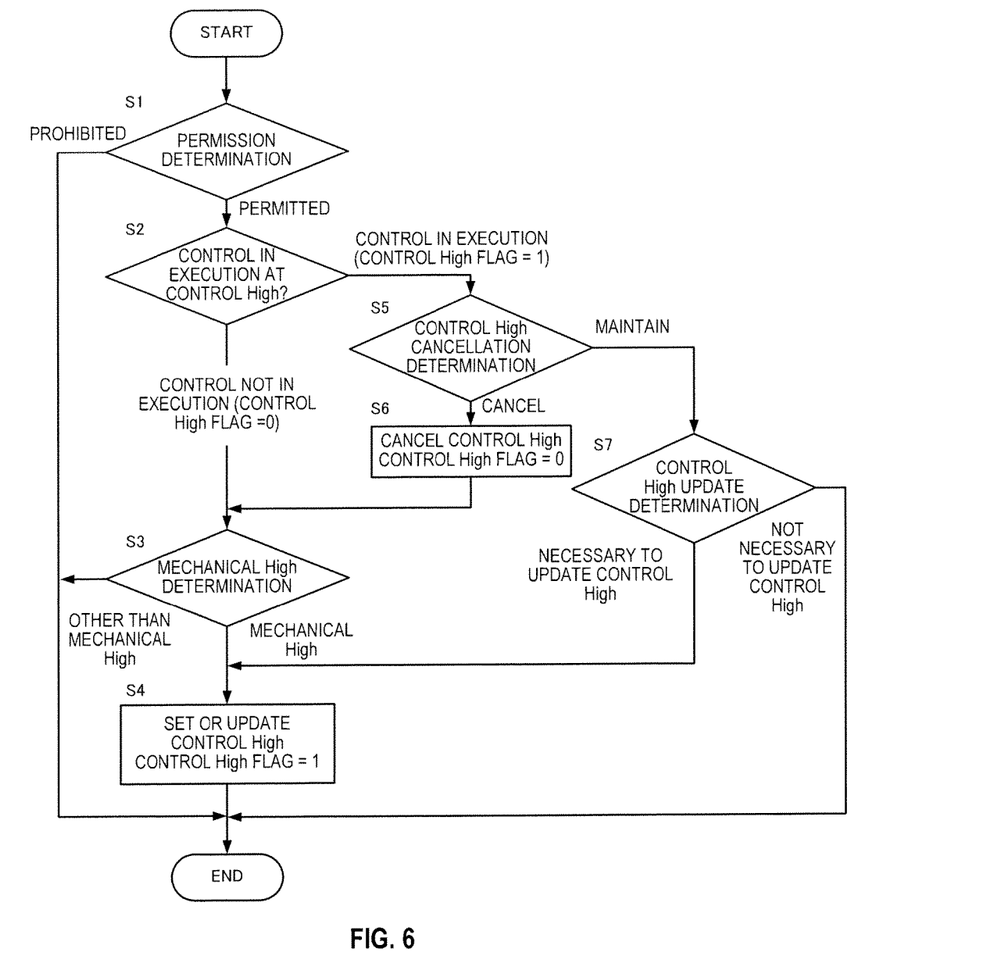
FIG. 6 is a flow chart showing the contents of a control High setting process.

FIG. 6 is a flow chart showing a control High setting process. A procedure of setting the control High is described with reference to this flow chart.

According to this, first in S1, the transmission controller 12 determines whether or not the control High setting process is permitted.

As described later, the transmission controller 12 sets the control High based on the mechanical High using the actual speed ratio when the target speed ratio and the actual speed ratio are higher than a predetermined speed ratio and a deviation occurs between the target speed ratio and the actual speed ratio as the mechanical High. A possible value of the mechanical High is between a lowest value (hereinafter, referred to as "variation Low") and a highest value (hereinafter, referred to as "variation High") taking into account dimensional tolerances of the pulleys and the like. Thus, if the actual speed ratio and the target speed ratio of the CVT 1 are lower than the variation Low and there is no deviation between the target speed ratio and the actual speed ratio, the mechanical High necessary to set the control High cannot be searched in the first place. Thus, the above predetermined speed ratio is set at the above "variation Low".

Accordingly, if the actual speed ratio and the target speed ratio of the CVT 1 are lower than the variation Low as the predetermined speed ratio, the control High setting process is not permitted.

Conversely, if the actual speed ratio and the target speed ratio of the CVT 1 are higher than the variation Low, it is possible to search the mechanical High. Thus, the control High setting process is permitted. If the control High setting process is permitted, the process proceeds to S2. It should be noted that the values of the variation Low and the variation High are stored in the transmission controller 12.

In S2, the transmission controller 12 determines whether or not the control is in execution at the control High. Whether or not the control is in execution at the control High is determined based on the value of a control High flag. Since an initial value of the control High flag is set at 0 (control is not in execution at the control High), the process proceeds to S3 when this process is performed for the first time.

In S3, the transmission controller 12 determines whether or not the actual speed ratio has reached the mechanical High. Specifically, the transmission controller 12 determines that the actual speed ratio at that point of time is the mechanical High if either one of the following (a) and (b) is satisfied.

(a) Case where the target speed ratio is set at the speed ratio of the variable High, the target speed ratio is higher than the actual speed ratio, the absolute value of a changing rate of the target speed ratio is smaller than a predetermined value and it is determined that a shift is not performed, and this state continues for a predetermined time.

(b) Case where the target speed ratio is set at the speed ratio of the variable High, the target speed ratio is higher than the actual speed ratio, the absolute value of the changing rate of the target speed ratio is smaller than the predetermined value and it is determined that a shift is not performed, and a change in the FB operation amount after it is determined that the target speed ratio is higher than the actual speed ratio and a shift is not performed is not smaller than a predetermined value.

The continuation for the predetermined time is set as a condition in (a) to prevent erroneous detection. Further, it is determined not only in (a), but also in (b) that the actual speed ratio is the mechanical High because the FB operation amount drastically increases and the mechanical High is not determined with the conditions of (a) before the primary pressure Ppri drastically increases if the mechanical High is considerably lower than the target speed ratio. An increase of the primary pressure Ppri can be suppressed by adding (b) and determining the mechanical High early if a change in the FB operation amount is large.

The process proceeds to S4 if the mechanical High is determined.

In S4, the transmission controller 12 sets the mechanical High. The control High is set lower than the mechanical High by the amplitude A of the actual speed ratio caused by the speed ratio feedback control or more. Preferably, the control High is set lower than the mechanical High only by the amplitude A.

It should be noted that the target speed ratio is caused to follow the control High when the control High is set and the target speed ratio is limited by the control High. If a change amount of the target speed ratio caused by this is relatively large, an operation amount of the speed ratio feedback control suddenly changes and the feedback control possibly becomes unstable. Thus, a change rate of the control High is limited by a limit processing.

When the control High is set, the control High flag is set to 1 indicating that the control is in execution at the control High. If the value of the control High is smaller than that of the variable Low, the speed ratio range in the shift control of the CVT 1 is expanded to the control High. Thereafter, the process proceeds from S2 to S5 to carry out control High cancellation determination and update determination.

The control High cancellation determination and update determination are carried out for the following reason. A change is made depending on a load acting on the belt. Particularly, in the present embodiment in which the primary pulley 2 includes the stopper, if a load acting on the belt 4 changes, elements of the belt are pushed out radially outwardly of the pulleys to stretch a ring supporting the elements. Since the secondary pulley 3 includes no stopper, a belt winding diameter on the side of the secondary pulley 3 increases due to the stretch of the ring. Thus, a radius ratio of the primary pulley 2 and the secondary pulley 3 changes and the mechanical High becomes lower, wherefore it is necessary to set again or update the control High.

In S5, the transmission controller 12 performs the control High cancellation determination. Specifically, the transmission controller 12 determines to cancel the control High if any of the following (c) to (e) is satisfied.

(c) Case where the target speed ratio becomes lower than the control High.

(d) Case where the actual speed ratio becomes higher than the mechanical High.

(e) Case where a secondary thrust force (secondary pressure Psec) is decreased by a predetermined value or larger after the control High is set.

(c) is set as a condition for the following reason. Since the target speed ratio is lower than the mechanical High and the control High is not used, the reliability of the control High is maintained by temporarily canceling the control High in such a situation and, thereafter, setting the control High again when a situation is reached where the control High is necessary.

(d) is set as a condition to detect a case where a rotation ratio of the primary pulley and the secondary pulley becomes higher due to the occurrence of belt slippage. For example, such a case is assumed where the rotation of the primary pulley is reduced, but the rotation of the secondary pulley is maintained when belt slippage occurs such as in the case of driving the primary pulley by the secondary pulley during coasting and regeneration.

(e) is set as a condition for the following reason. The mechanical High deviates from the value searched in S3 and the control High set in S4 no longer makes sense when the actual speed ratio becomes higher than the mechanical High or when a lower limit value of the secondary pressure is switched due to an oil temperature condition or the like and a function of increasing and decreasing the secondary pressure works due to an accelerator pedal operation or a brake pedal operation, thereby reducing the secondary thrust force by a predetermined value or larger. Also in such a case, the control High is canceled and set again.

In the case of determination to cancel the control High, the process proceeds to S6 to cancel the control High. Then, the control High flag is set to 0 indicating that the control is not in execution at the control High.

In S7, the transmission controller 12 determines whether or not to update the control High. Specifically, the transmission controller 12 performs the same determination as that of the mechanical High in S3 and determines the actual speed ratio at that point of time as a new mechanical High if either one of the conditions (a) and (b) in S3 is satisfied. Then, the process proceeds to S4 to update the control High. Even if a situation to cancel the control High is absent in S6, the reliability of the control High is maintained by performing such an update processing as needed.

It should be noted that since the mechanical High changes from moment to moment depending on travelling conditions, the control High also changes according to a change of the mechanical High. Since the target speed ratio is limited by the control High, the update of the control High during which the target speed ratio continues to change from moment to moment according to a change of the control High and the speed ratio control becomes unstable is not performed while the limit processing is performed for the control High.

Figure 7:
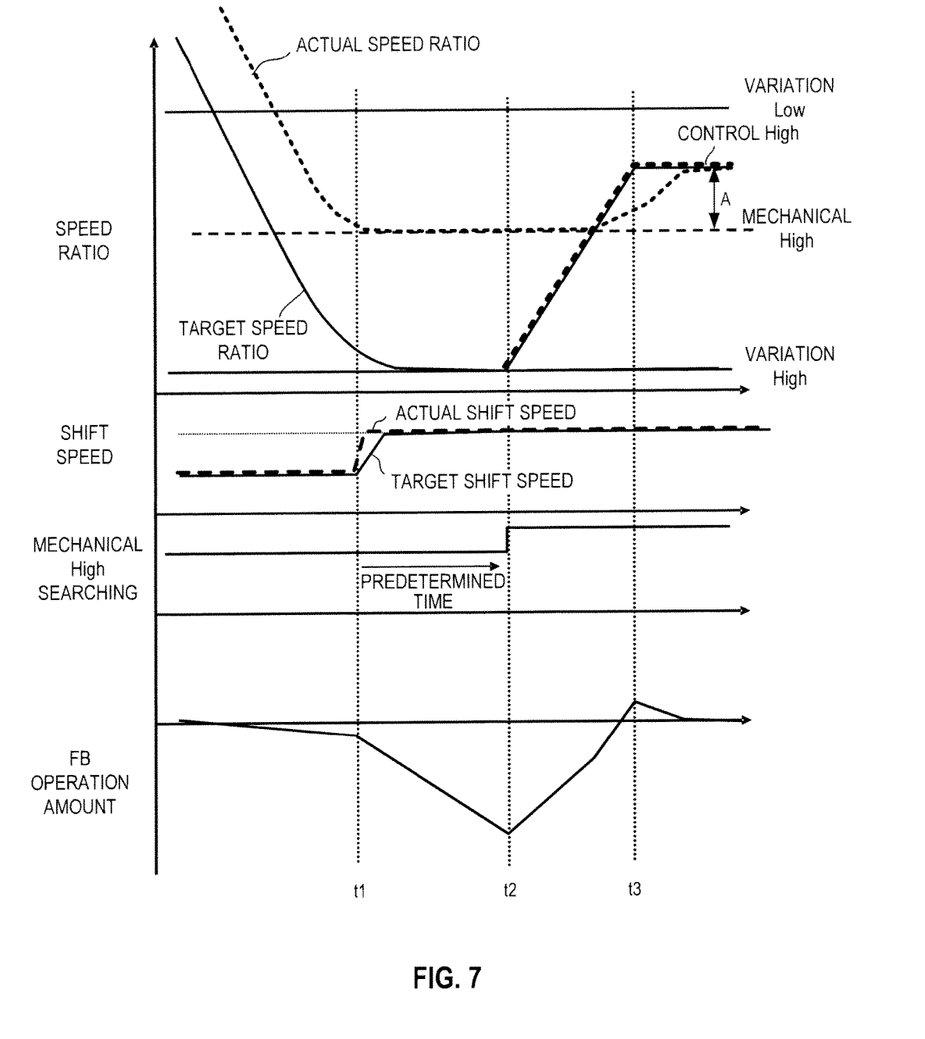
FIG. 7 is a time chart showing functions and effects of the present invention.

FIG. 7 is a time chart showing a state where the control High is set.

If the target speed ratio changes toward the variable High, the actual speed ratio also becomes higher as shown in FIG. 7.

However, when reaching the mechanical High, the actual speed ratio no longer changes, thereby creating a deviation between the target speed ratio and the actual speed ratio (time t1).

If a predetermined time elapses in this state while a shift is not performed, the actual speed ratio at that point of time is determined to be the mechanical High according to the above control High setting process (time t2).

Then, the control High is set lower than the mechanical High by the amplitude A of the actual speed ratio or more (preferably only by the amplitude A). Thereafter, the speed ratio is controlled to expand the speed ratio range to the control High.

It should be noted that, during a period between time t2 and time t3, the primary pressure and the secondary pressure drastically change due to a drastic change of the deviation between the actual speed ratio and the target speed ratio if the control High is drastically changed. Thus, the change rate of the control High is limited by the limit processing.

Next, functions and effects of the present embodiment are described.

Since the speed ratio range of the CVT 1 is expanded to the control High close to the mechanical High according to the present embodiment, fuel economy of the vehicle equipped with the CVT 1 can be improved up to a level substantially equivalent to that when the speed ratio range of the CVT 1 is up to the mechanical High.

Further, since the actual speed ratio can fluctuate about the control High also while the control is executed with the target speed ratio as the control High, the FB operation amount is not accumulated even if the control is executed with the target speed ratio as the control High and good shift responsiveness is obtained in the case of downshifting the CVT 1 during acceleration.

It should be noted that the above fuel economy improving effect is maximally exhibited when the control High is set lower than the mechanical High by the amplitude A of the actual speed ratio.

Further, since the mechanical High is set at the actual speed ratio when the target speed ratio continues to be higher than the actual speed ratio, the reliability of the control High can be enhanced by preventing erroneous determination of the mechanical High.

Further, if the target speed ratio continues to be higher than the actual speed ratio again after the control High is set, the mechanical High is searched again and the control High is updated. Also by this, the reliability of the control High can be enhanced.

Although the embodiment of the present invention has been described above, the above embodiment is merely an illustration of one application example of the present invention and not of the nature to limit the technical scope of the present invention to the specific configuration of the above embodiment.

The present application claims a priority of Japanese Patent Application No. 2012-138623 filed with the Japan Patent Office on Jun. 20, 2012, all the contents of which are hereby incorporated by reference.

The invention claimed is:

1. A continuously variable transmission in which an actual speed ratio is feedback-controlled to a target speed ratio, comprising:
   a mechanical High searching unit adapted to search a mechanical High, which is a minimum value of a possible speed ratio of the continuously variable transmission, based on the actual speed ratio;
   a control High setting unit adapted to set a control High lower than the mechanical High by a predetermined amount; and
   a speed ratio controlling unit adapted to control a speed ratio of the continuously variable transmission by setting a minimum value of a speed ratio range of the continuously variable transmission at the control High.

2. The continuously variable transmission according to claim 1, wherein:
   the predetermined amount is set larger than or equal to an amplitude of fluctuation of the speed ratio of the continuously variable transmission about the target speed ratio caused by the feedback control.

3. The continuously variable transmission according to claim 2, wherein:
   the predetermined amount is set equal to the amplitude of the fluctuation.

4. The continuously variable transmission according to claim 1, wherein:
   the mechanical High searching unit determines the actual speed ratio as the mechanical High when the target speed ratio continues to be higher than the actual speed ratio.

5. The continuously variable transmission according to claim 1, further comprising:
   a control High updating unit adapted to search the mechanical High again and update the control High based on the mechanical High searched again when the target speed ratio continues to be higher than the actual speed ratio again after the control High is set.

6. A control method for a continuously variable transmission for feedback-controlling an actual speed ratio to a target speed ratio, comprising:
   searching a mechanical High, which is a minimum value of a possible speed ratio of the continuously variable transmission, based on the actual speed ratio;
   setting a control High lower than the mechanical High by a predetermined amount; and
   controlling a speed ratio of the continuously variable transmission by setting a minimum value of a speed ratio range of the continuously variable transmission at the control High.

7. A continuously variable transmission in which an actual speed ratio is feedback-controlled to a target speed ratio, comprising:
   mechanical High searching means for searching a mechanical High, which is a minimum value of a possible speed ratio of the continuously variable transmission, based on the actual speed ratio;
   control High setting means for setting a control High lower than the mechanical High by a predetermined amount; and
   speed ratio controlling means for controlling a speed ratio of the continuously variable transmission by setting a minimum value of a speed ratio range of the continuously variable transmission at the control High.

* * * * *